Jan. 27, 1948.  G. A. LYON  2,435,045
VEHICLE WHEEL COVER
Filed Sept. 4, 1945
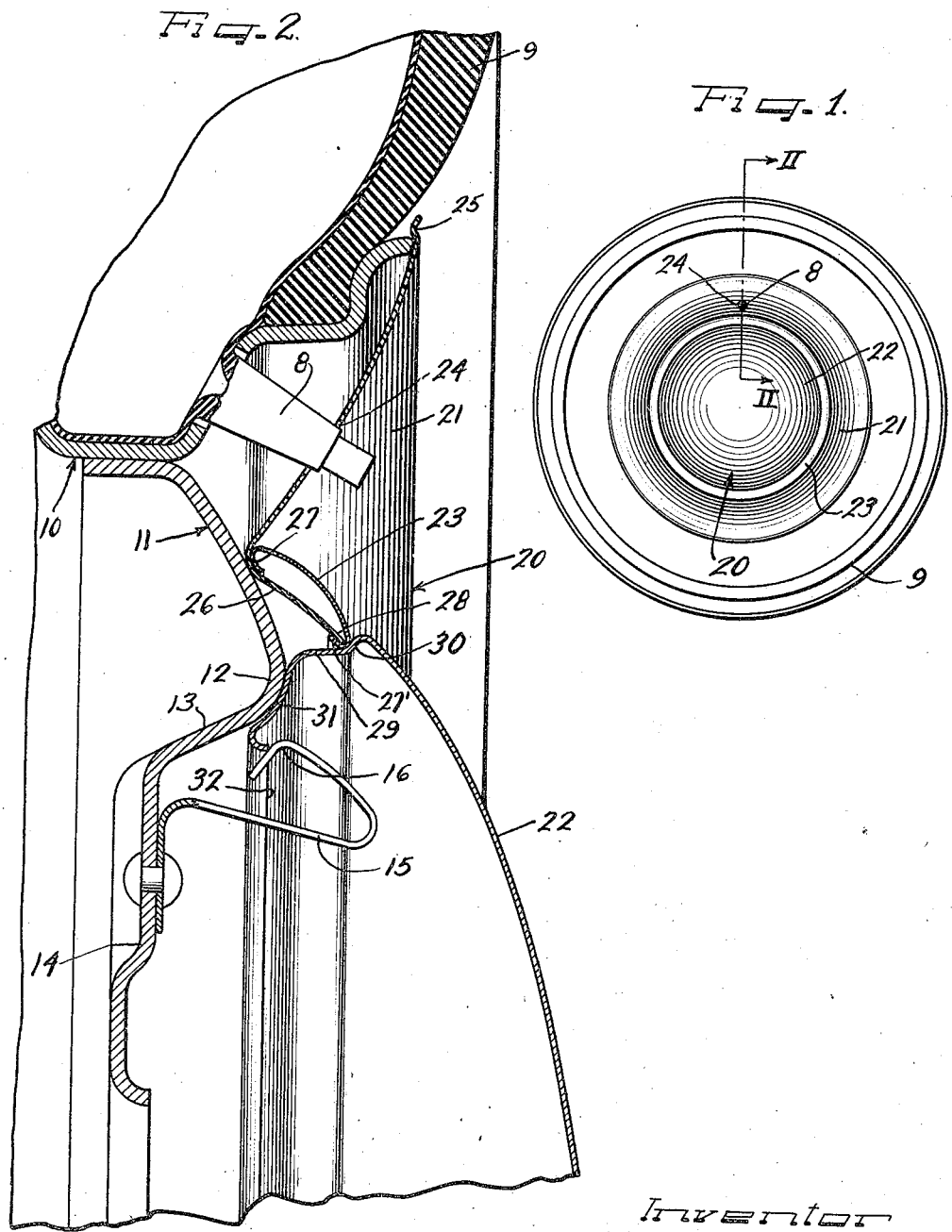
Inventor
GEORGE ALBERT LYON Patented Jan. 27, 1948

2,435,045

UNITED STATES PATENT OFFICE 2,435,045

VEHICLE WHEEL COVER

George Albert Lyon, Allenhurst, N. J.

Application September 4, 1945, Serial No. 614,417

4 Claims. (Cl. 301—37)

This invention relates to a wheel structure and more particularly to a novel multipart cover assembly for an automobile wheel.

An object of this invention is to provide a simple but highly ornamental cover assembly for an outer side of an automobile wheel.

Another object of this invention is to provide a unique structure for detachably interconnecting concentric members of a multipart cover assembly.

A further object of this invention is to so interrelate concentric parts of a cover assembly that they will cooperate to provide a highly pleasing and effective ornamental appearance.

In accordance with the general features of this invention there is provided in a cover structure for a wheel including a tire rim and a load-bearing body part having cover retaining means, a multipart cover assembly including concentric radially outer and inner circular nested members, the outermost of which comprises an annulus made of resiliently deflectable form-sustaining plastic and the innermost or central of which comprises a circular hub cap of much more rigid material and provided with an underturned edge cooperable with the retaining means on the wheel body part.

A still further feature of the invention relates to the provision in the aforesaid cover assembly of an annular retaining ring at the junction of the members tightly nested over an inclined rear margin of the central circular or hub cap member and interlocked with an inner edge of the outer annular member to retain the same on the central member whereby a unitary structure is provided.

Other objects and features of this invention will more fully appear from the following detail description taken in connection with the accompanying drawing which illustrates a single embodiment thereof and in which Figure 1 is a side view of an automobile wheel and cover assembly having the features of this invention; and Figure 2 is an enlarged fragmentary cross sectional view taken on substantially the line II—II of Figure 1 looking in the direction indicated by the arrows, showing the manner in which my novel multipart cover assembly cooperates with the rim and body parts of the wheel.

As shown on the drawing:

The reference character 9 designates generally an automobile pneumatic tube and tire mounted in the usual way upon a multi-flange drop center type of tire rim 10. This tire rim is of a conventional construction and is formed so that the valve stem of the tire and tube assembly 9 may project through a flange thereof.

The tire rim part 10 of the wheel is supported in the usual way upon a body or load-bearing part 11, which comprises a dished metallic stamping. This body part 11 includes an axially outwardly bulged nose portion 12, terminating in a centrally depressed flange 13, which in turn merges in a radially extending bolt-on flange 14. The bolt-on flange 14 is adapted to be secured in the usual way by bolts or cap screws (not shown) to a part on an axle. In addition, this flange 14 is provided with the usual hub cap retaining spring clips 15 which may be of any suitable number, such, for example, as three to five. Each of these clips is of the so-called "inverted" type, which is now well known in the industry.

The goose-neck end of the clip 15 is provided with an inclined angular free extremity 16, over which an edge of a cover part is adapted to be cammed for the purpose of detachably retaining the cover part on the wheel in cooperation with the nose 12 of the body part 11.

Cooperable with the aforesaid wheel is a multipart cover assembly designated generally by the reference character 20 and embracing the features of this invention. This assembly 20 includes an outer annular plastic ring 21, a central metallic hub cap 22 and an intermediate metallic connecting ring 23.

The convex-concave ring 21 has an aperture 24 through which an outer extremity of the valve stem 8 can project in order to afford access to the valve stem without removing the cover.

The outer edge of the ring part 21 is slightly turned at 25 and is adapted to bear against an outer edge of the rim part 10 in close proximity to an outer side wall of the tire. It will be perceived that the ring 21 is of such radial depth and curvature that, in use, it will appear to constitute a symmetric continuation of the outer side wall of the tire 9. This is very desirable in that it affords the illusion of the tire appearing to extend clear down to the body part 11. Moreover, this illusionary appearance may be accentuated by giving the ring 21 a white external finish or by making it of white plastic, in which event it will appear to constitute a white side wall part or portion of the tire 9.

The radially inner margin of the ring 21 is turned axially outwardly at 26 toward an outer portion of the hub cap part 22.

It will be noted that the divergent or turned portion 26 of the ring 21 extends behind the annular metal ring or bead 23, which bead has an outer turned edge 27 bottomed in and against the turned portion of the ring 21. In addition, this ring 23 has its radially inner margin underturned to form a turned edge 27' adapted to overlap the extreme inner edge 28 of the ring 21 so as to be interlocked therewith.

The turned edge 27' of the intermediate ring 23 is adapted to be bottomed on the inclined or tapered rear flange 27 of the hub cap 22 behind an annular shoulder 30 formed in the peripheral margin of the hub cap part. The inclined or tapered portion 29 of the hub cap terminates in a curved rear flange 31 shaped to fit tightly against the nose portion 12 of the body part 11. In addition, this flange 31 terminates in a slightly turned edge 32 adapted to be cammed over and behind the angular free extremities 16 of the spring clips 15 for retention of the cover assembly on the wheel.

I preferably make the outer annular part or ring 21 of a synthetic plastic material, such, for example, as ethyl cellulose, cellulose acetate or vinyl resins. While this part is preferably made of a synthetic plastic which is deflectable without permanent deformation, it is, of course, to be understood that it may be made of other material suitable for the desired ultimate ornamental effect.

Both of the parts 23 and 22 may be made from sheet metal. I preferably contemplate making the hollow annular intermediate bead 23 from stainless steel and it should be noted that this bead lends itself to manufacture on a large production scale on a rolling machine. As distinguished therefrom the metal hub cap part 22 may be fabricated from sheet stock through the use of suitable press and die equipment.

Many different pleasing color contrasts are possible with the three-part assembly above described. One very desirable color effect may be attached if the ring 21 is made of white plastic or the intermediate bead 23 of a lustrous finish and the central hub cap part 22 of a dark color finish. For illustration, this central hub cap part 22 may be given a black finish or it may be finished to match the color on the body of the vehicle. Also, as is customary, the central portion of the hub cap 22 may carry the medallion or emblem of the vehicle (not shown).

In the assembly of the cover structure, the inner turned margin 26 of the plastic outer ring 21 is first interlocked with the annular bead 23 and then the bead with the plastic thereon is applied from the rear side of the hub cap 22 to the inclined flange 29 until the turned inner edge 27' of the bead 23 is bottomed against the shoulder 30 of the hub cap.

Thereafter, this assembly 20 may be applied in the usual way to the outer side of the wheel by pressing it axially home against the body part 12 in which position the clips 15 will wedgingly force the edge 32 of the hub cap against the turned flange 13 of the body part. In this manner, the outer ring 21 may be tightly held in stressed engagement with the body part 12 and the outer edge of the rim part 10.

To remove the cover all that is necessary for the operator to do is to slightly deflect the outer margin of the plastic ring 21 and to insert a screw driver under the turned inner margin of the ring behind the turned edge 27 of the reinforcing metal bead 23. This bead will resist deformation of the plastic and enable springing of the cover assembly off of the retaining spring clips.

I claim as my invention:

1. In a cover structure for a wheel including a tire rim and a load bearing body part having cover retaining means, a multipart cover assembly including concentric radially outer and inner nested members, said outer member comprising an annulus made of resiliently deflectable form-sustaining plastic and said central member comprising a circular hub cap of much more rigid material and provided with an underturned edge cooperable with said retaining means and an annular reinforcing ring at the junction of said members tightly nested over an inclined margin of said central member and interlocked with an inner edge of said outer member.

2. In a cover structure for a wheel including a tire rim and a load bearing body part having cover retaining means, a multipart cover assembly including concentric radially outer and inner nested members, said outer member comprising an annulus made of resiliently deflectable form-sustaining plastic and said central member comprising a circular hub cap of much more rigid material and provided with an underturned edge cooperable with said retaining means and an annular reinforcing ring at the junction of said members tightly nested over an inclined margin of said central member and interlocked with an inner edge of said outer member, said ring comprising a hollow metal bead at the outer side of the cover with its margins underturned, the outermost of which is bottomed on the central member and the inner of which receives the radially inner edge of the outer member.

3. In a cover structure for a wheel including a tire rim and a load bearing body part having cover retaining means, a multipart cover assembly including concentric radially outer and inner nested members, said outer member comprising an annulus made of resiliently deflectable form-sustaining plastic and said central member comprising a circular hub cap of much more rigid material and provided with an underturned edge cooperable with said retaining means and an annular reinforcing ring at the junction of said members tightly nested over an inclined margin of said central member and interlocked with an inner edge of said outer member, both of said cover members including a turned portion positioned to bottom on spaced portions of said body part when said central member is in retained cooperation with said retaining means.

4. In a cover structure for a wheel including a tire rim and a load bearing body part having cover retaining means, a multipart cover assembly including concentric radially outer and inner nested members, said outer member comprising an annulus made of resiliently deflectable form-sustaining plastic and said central member comprising a circular hub cap of much more rigid material and provided with an underturned edge cooperable with said retaining means and an annular reinforcing ring at the junction of said members tightly nested over an inclined margin of said central member and interlocked with an inner edge of said outer member, both of said cover members including a turned portion positioned to bottom on spaced portions of said body part when said central member is in retained cooperation with said retaining means and said outer member having a turned edge arranged to bear against an edge of the tire rim in close proximity to a tire carried thereon.

GEORGE ALBERT LYON.

REFERENCES CITED

The following references are of record in the file of this patent:

UNITED STATES PATENTS

| Number | Name | Date |
| --- | --- | --- |
| 1,948,273 | Lyon | Feb. 20, 1934 |
| 1,965,529 | Lyon | July 3, 1934 |
| 2,212,037 | Lyon | Aug. 20, 1940 |